United States Patent
Edmondson

(12) 
(10) Patent No.: US 6,968,901 B2
(45) Date of Patent: Nov. 29, 2005

(54) OIL PRODUCTION PROCESSING SYSTEM FOR SWAYING SERVICE

(76) Inventor: Jerry M. Edmondson, 2 Escapade Ct., Newport Beach, CA (US) 92663

( * ) Notice: Subject to any disclaimer, the term of this patent is extended or adjusted under 35 U.S.C. 154(b) by 120 days.

(21) Appl. No.: 10/338,157

(22) Filed: Jan. 8, 2003

(65) Prior Publication Data

US 2004/0129426 A1 Jul. 8, 2004

(51) Int. Cl.⁷ .............................................. E21B 43/36
(52) U.S. Cl. ..................... 166/357; 166/352; 210/521
(58) Field of Search ............................. 166/357, 267, 166/352; 210/521, 539, 774, 801

(56) References Cited

U.S. PATENT DOCUMENTS

| | | | | |
|---|---|---|---|---|
| 4,308,136 A | * | 12/1981 | Warne, Jr. ................... | 210/114 |
| 4,572,786 A | * | 2/1986 | Endo .......................... | 210/188 |
| 4,948,393 A | * | 8/1990 | Hodson et al. ................ | 95/250 |
| 5,223,148 A | * | 6/1993 | Tipman et al. ............... | 210/744 |
| 5,302,294 A | * | 4/1994 | Schubert et al. ............. | 210/702 |
| 5,878,814 A | * | 3/1999 | Breivik et al. .............. | 166/267 |
| 5,988,283 A | * | 11/1999 | Gann .......................... | 166/357 |
| 6,019,174 A | * | 2/2000 | Korsgaard ................... | 166/352 |
| 6,123,494 A | * | 9/2000 | Henrich et al. .............. | 414/217 |

* cited by examiner

Primary Examiner—Hoang Dang

(57) ABSTRACT

A method for processing oil from oil wells having water bound locations whereby it is necessary to place the process containment vessels upon host structures that are floating and subjected to a swaying motion caused by the wave action of the water in which the host structures float. The process containment vessels are of a vertical cylindrical configuration to minimize their footprint and to mitigate the effect of tilting on the spatial process geometry inside of the vessels and further the vessels contain internal baffles that create horizontal flow patterns inside of the vertical vessel for a more efficient gravity separation process.

1 Claim, 1 Drawing Sheet

OIL PRODUCTION PROCESSING SYSTEM FOR SWAYING SERVICE

FIELD OF THE INVENTION

Figure 1:
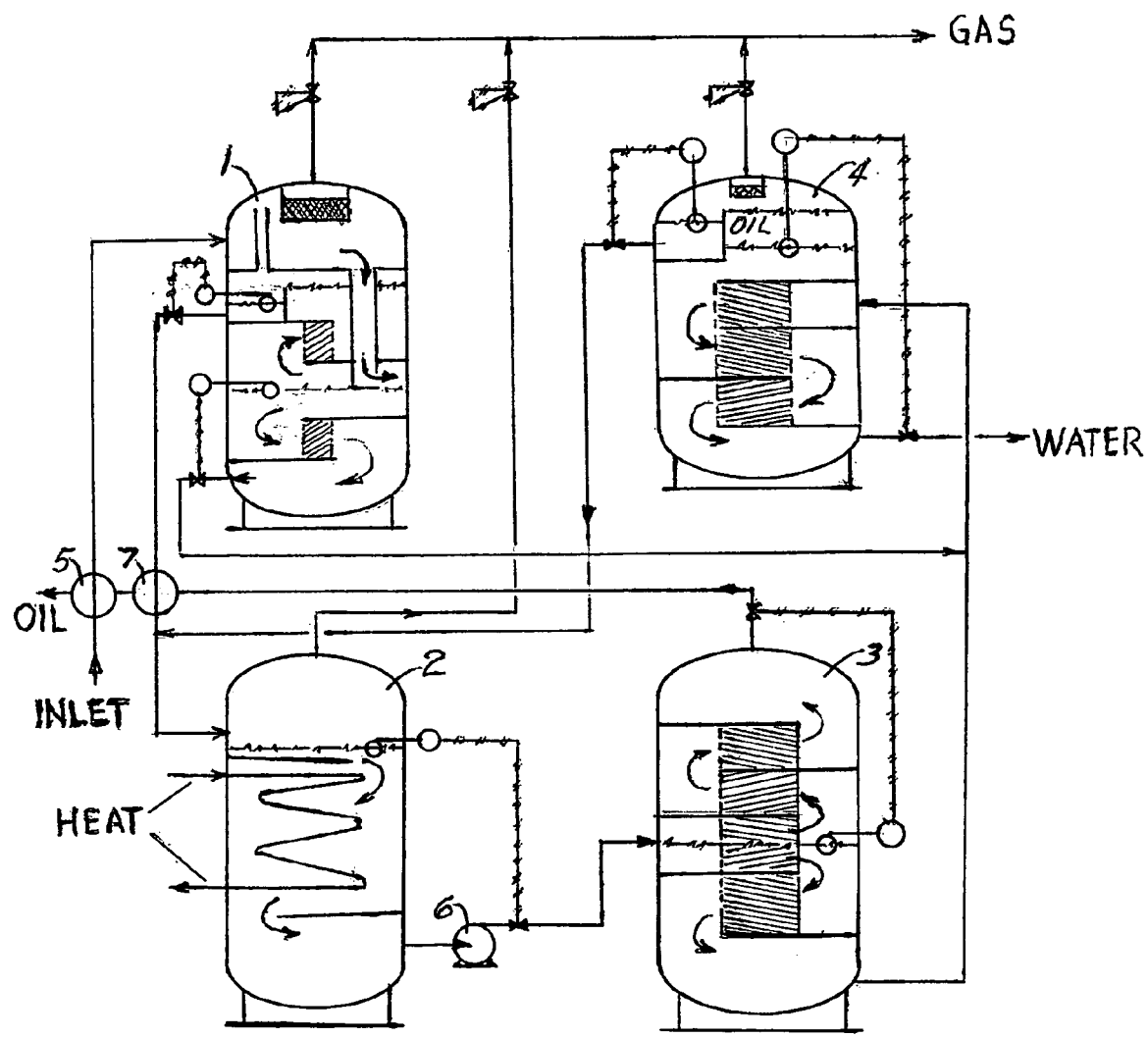

This invention relates to methods for processing oil production from water bound oil wells wherein it is necessary to place the processing containment vessels upon floating host structures such as ships or floating platforms.

BACKGROUND OF THE INVENTION

When placing oil production process containment vessels upon floating host structures it is essential to have the containment vessels occupy the minimum amount of floor space and further to configure the containment vessels in such a way that the swaying and tilting that is inherent to the heaving and rolling motion of the floating host structure as it responds to the natural wave action of the water upon which it rests, will have the least possible detrimental effect on the process performance.

Because the separating efficiency of containment vessels utilizing horizontal flow paths such as those described by my U.S. Pat. Nos. 5,865,992 and 5,902,483 is known to be superior to that of containment vessels employing vertical flow paths, to date horizontal containment vessels have been utilized most often.

The horizontal containment vessels have the disadvantage of occupying a relatively large floor space on the host structure and having their spatial process geometry appreciably affected by the swaying motion to the detriment of the processing performance.

My invention establishes a method and means for processing oil utilizing vertical cylindrical process containment vessels wherein a horizontal flow path for the processing scheme inside the vertical cylindrical containment vessels is established by a placement of baffles and/or bulkheads inside the vertical vessels to create a substantially horizontal flow path. This arrangement affords the separating efficiency of the horizontal flow path while occupying less floor space on the host structure and having the spatial process geometry of the containment vessel virtually unaffected by the swaying motion.

SUMMARY OF THE INVENTION

This invention is for a method and means of processing oil production from water bound oil wells where it is necessary to place the process containment vessels upon host structures that are subjected to rolling and heaving as a consequence of the host structure floating in water where the elements of nature can cause waves in the water.

More particularly this invention discloses a method and means for carrying out the method of processing the oil whereby the advantage of horizontal flow processing paths is accomplished while utilizing vertical cylindrical process containment vessels including internal structures that impart a horizontal flow inside the vessels that have the further advantage of the swaying motion affecting the spatial processing geometry inside the containment vessel very little and the containment vessels occupying less floor space than would be the case when using conventional horizontal process containment vessels.

BRIEF DISCRIPTION OF THE DRAWING

The drawing is a schematic showing all of the essential elements for accomplishing the significant advantages derived by this novel method of processing oil produced from water bound oil wells constituting the preferred embodiment of the invention.

DETAILED DISCRIPTION OF THE PREFERRED EMBODIMENT (Referring to the Drawing)

This method of processing oil produced from oil wells at water bound locations consists of four main vertical cylindrical process containment vessels, a Three Phase Production Separator 1, a Heating/Degassing Vessel 2, an Oil Dehydration Vessel 3 and a Water Degassing/De-Oiling Vessel 4. Other major ancillary components include a Cross Heat Exchanger 5, a Booster Pump 6 and possibly an Auxiliary Cross Heat Exchanger 7.

The oil flows from the oil well(s) through the Heat Exchanger 5 into the Separator 1 in which there is a baffle configuration that establishes a substantially horizontal flow pattern inside the Separator to enhance the separation efficiency. Within this Separator associated water and gas are separated from the oil.

The oil is delivered from the Separator to the Heating/Degassing Vessel 2 wherein the process pressure is reduced and the process temperature is elevated. This vessel is of a vertical configuration to mitigate the change in the spatial process geometry as a result of the vessel swaying and to reduce the occupied floor space.

The oil is delivered from the Heating/Degassing Vessel via the Booster Pump 6 to the Oil Dehydration Vessel 3 in which there is a baffle configuration to establish a horizontal flow pattern inside the vessel to enhance the water separation efficiency. The oil leaves the Oil Dehydration Vessel flowing through the Auxiliary Heat Exchanger 7 if applicable and exits the system through the Cross Heat Exchanger 5. The water discharged from the Separator 1 and the Dehydrator 3 is delivered to the Water Degassing and De-Oiling Vessel 4 having an internal baffle configuration that establishes a horizontal flow pattern thereby enhancing the separation efficiency.

What I claim is:

1. An oil production processing system mounted on a floating structure comprising:
    vertically elongated cylindrical process containment vessels mounted on said floating structure and having internal baffles and structures configured to cause the fluids being processed to flow through the processing vessels in a mostly horizontal flow direction, at least some of said internal baffles and structures being perpendicular to the vertical configuration of the processing vessels, and said vessels including:
    a. a first vessel for separating oil, water and gas into disparate constituents,
    b. a second vessel into which the separated oil is directed for heating of the oil at a reduced pressure to separate further gas from the said oil,
    c. a third vessel into which the said oil from which further gas has been separated is pumped for further separation of water from said oil and
    d. a fourth vessel into which the water separated from the oil and gas in the first and/or third vessel(s) is delivered for the purpose of removing the final traces of gas and oil from said water.

* * * * *